United States Patent
McNitt et al.

(10) Patent No.: US 7,079,637 B1
(45) Date of Patent: Jul. 18, 2006

(54) SYSTEM AND METHOD FOR DETECTING UNAUTHORIZED CALL ACTIVITY

(75) Inventors: George McNitt, Keller, TX (US); Tom Jurcak, Irving, TX (US)

(73) Assignee: Evercom Systems, Inc., Dallas, TX (US)

( * ) Notice: Subject to any disclaimer, the term of this patent is extended or adjusted under 35 U.S.C. 154(b) by 457 days.

(21) Appl. No.: 10/420,585

(22) Filed: Apr. 22, 2003

(51) Int. Cl.
*H04M 1/66* (2006.01)
*H04M 3/22* (2006.01)
*H04M 3/58* (2006.01)

(52) U.S. Cl. .............. 379/189; 379/196; 379/199; 379/207.01; 379/377

(58) Field of Classification Search ............ 379/188, 379/189, 196, 197, 198, 199, 377, 200, 207.01
See application file for complete search history.

(56) References Cited

U.S. PATENT DOCUMENTS

| | | | |
|---|---|---|---|
| 5,319,702 A | 6/1994 | Kitchin et al. ............ 379/189 |
| 5,539,812 A | 7/1996 | Kitchin et al. ............ 379/189 |
| 5,745,558 A * | 4/1998 | Richardson et al. ... 379/207.01 |
| 5,768,355 A | 6/1998 | Salibrici et al. .......... 379/189 |
| 5,796,811 A | 8/1998 | McFarlen .................. 379/189 |
| 5,805,685 A | 9/1998 | McFarlen .................. 379/189 |
| 5,883,945 A * | 3/1999 | Richardson et al. ...... 379/189 |
| 5,926,533 A | 7/1999 | Gainsboro ................. 379/189 |
| 6,895,086 B1 * | 5/2005 | Martin ...................... 379/189 |

OTHER PUBLICATIONS

U.S. Appl. No. 10/135,878, John J. Viola et al., entitled "Information Management and Movement System and Method," filed Apr. 29, 2002.
U.S. Appl. No. 10/252,956, George McNitt et al., entitled "Three-Way Telephone Call Prevention System and Method," filed Sep. 20, 2002.

* cited by examiner

*Primary Examiner*—Harry S. Hong
(74) *Attorney, Agent, or Firm*—Fulbright & Jaworski LLP

(57) ABSTRACT

Disclosed are systems and methods which detect unauthorized, impermissible, or otherwise undesired call activity through a silence detection technique employing multiple samples. One embodiment monitors a call in progress to detect an event such as might be indicative of unauthorized call activity. Thereafter, a sampling process may be invoked which analyzes multiple samples of the call to make a determination as to whether or not a particular unauthorized call activity is being attempted. A party to the call may be muted to thereby prevent that party from thwarting the unauthorized call activity determination. Embodiments implement techniques for defeating parties to calls learning the unauthorized call activity detection system in order to avoid detection, such as by implementing a plurality of detection techniques.

50 Claims, 2 Drawing Sheets

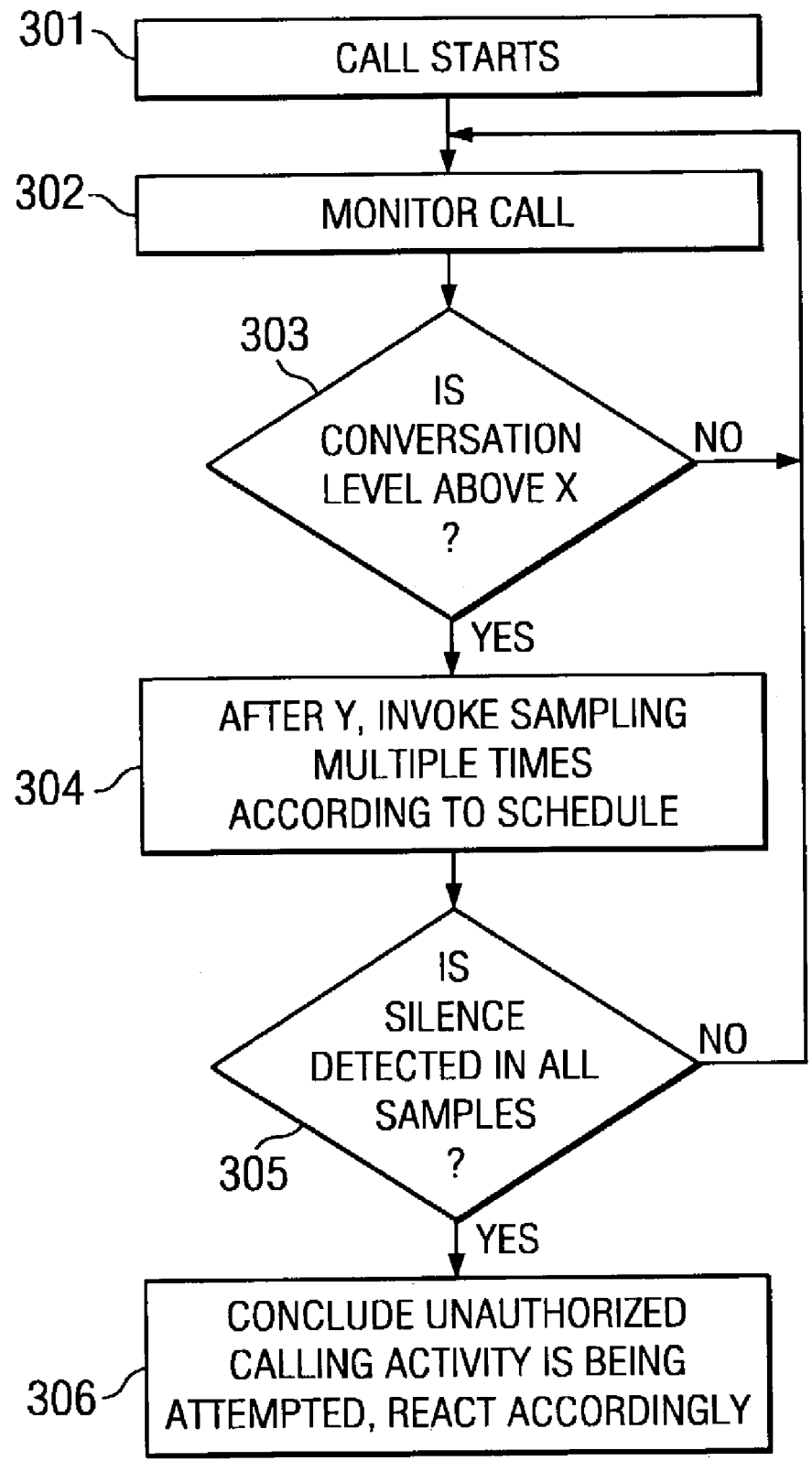

SYSTEM AND METHOD FOR DETECTING UNAUTHORIZED CALL ACTIVITY

CROSS-REFERENCE TO RELATED APPLICATIONS

The present application is related to co-pending and commonly assigned U.S. patent application Ser. No. 10/252,956 entitled "Three-Way Telephone Call Prevention System and Method," filed Sep. 20, 2002, and Ser. No. 10/135,878 entitled "Information Management and Movement System and Method," filed Apr. 29, 2002, the disclosures of which are hereby incorporated herein by reference.

TECHNICAL FIELD

The present invention is related generally to telephony and, more particularly, to detecting unauthorized or undesired activity with respect to a call.

BACKGROUND OF THE INVENTION

In providing telephony services it is often desirable to detect particular calling activity with respect to one or more parties to a call. For example, a local exchange carrier (LEC) may employ logic at a central office (CO) switch for detecting a subscriber's desire to invoke enhanced calling services. A subscriber may signal a CO switch of the LEC providing his telephony service that connection to a second line, as provided by a call waiting enhanced service, is desired by instigating a hook flash (releasing and reconnecting the line within a predetermined window of time). Similarly, a subscriber may signal a CO switch of the LEC providing his telephony service that conferencing of multiple lines, as provided by a three-way calling enhanced service, is desired by instigating a hook flash. Each of the foregoing examples sets forth a situation in which the subscriber is providing signaling which the subscriber desires to be detected by the appropriate CO equipment without reason to try and mask or hide the signaling from other telephony equipment.

However, in some situations particular call activity may be unauthorized, impermissible, or otherwise undesired. For example, in a prison setting it may be desirable to prevent a prisoner from calling particular parties, such as victims, judges, prosecuting attorneys, and the like, although such prisoners may be granted the privilege of calling friends and families. Although it may be relatively straight forward to implement logic in a prison phone system to prevent a prisoner from directly calling particular identified numbers or allowing a prisoner to call only particular identified numbers, the possibility of a miscreant accomplice may result in a prisoner being able to complete an unauthorized call. For example, an individual to which a prisoner is allowed the privilege of placing calls may invoke enhanced calling services, such as three-way calling, through his LEC to thereby place a calling prisoner in contact with a number which the prisoner is otherwise not permitted to call.

It should be appreciated that, although the accomplice may purposefully signal a CO associated with the LEC providing his telephony service in order to implement the aforementioned three-way calling service, the prison telephony system or other calling party side equipment associated with the prisoner's end of the call is not purposefully signaled. Accordingly, it is often exceedingly difficult to detect and/or prevent such calling activity. Moreover, the individuals engaged in such activity generally recognize that it is forbidden and go to great lengths to attempt to thwart techniques for detecting and preventing unauthorized calling activity.

Several attempts have been made in the art to detect and/or prevent three-way calling. For example, U.S. Pat. No. 5,319,702 issued to Kitchin utilizes analysis of hook flash wave forms to detect three-way calling. However, such wave forms are not always sufficiently predictable when passed through various networks and switches, e.g., local verses long distance calls and digital verses analog switches can result in such waveforms being appreciably different from call to call. U.S. Pat. No. 5,926,533 issued to Gainsburo implements tone detection to detect three-way calling. However, detection of such tones may be avoided by a party instigating the three-way calling properly timing their hook flash signaling. Moreover, such tones may be masked to avoid detection through introduction of masking signals, e.g., continuous loud noise, into the call during the tones. Accordingly, the foregoing techniques for detecting and/or preventing three-way calling often do not accurately recognize the three-way calling activity.

BRIEF SUMMARY OF THE INVENTION

The present invention is directed to systems and methods which detect unauthorized, impermissible, or otherwise undesired call activity through a silence detection technique employing multiple samples. For example, embodiments of the present invention monitor a call in progress to detect an event such as might be indicative of unauthorized call activity. Thereafter, a sampling process may be invoked which analyzes multiple samples of a called party's side of the call to make a determination as to whether or not a particular unauthorized call activity is being attempted.

Embodiments of the present invention monitor a call in a linear, non-compressed form, for a loud noise, e.g., presence of signal energy above a predetermined threshold, for an indication that unauthorized call activity may be being attempted. Thereafter, a series of samples may be taken of the call energy associated with the called party's side of the conversation to determine if a lack of signal energy (i.e., silence) is detected. A plurality of such samples are preferably made within a predetermined window following detection of the aforementioned loud noise in order to determine if an attempt is being made with respect to unauthorized call activity.

According to one embodiment, the calling party may be muted, or otherwise removed from the samples analyzed by the aforementioned sampling process, to thereby prevent a calling party from thwarting the unauthorized call activity determination. For example, a calling party may be muted from the conversation for a series of brief periods in which samples are being taken. Such an embodiment is particularly useful in preventing a calling party from creating masking noises, such as by blowing into the phone, transmitting dual tone multiple frequency (DTMF) signals, tapping the telephone handset receiver, etcetera, which may interfere in the unauthorized call activity determination without substantially impacting the quality of the conversation.

Embodiments of the present invention implement techniques for defeating parties to calls learning the unauthorized call activity detection system in order to avoid detection. For example, the above described event detection followed by silence sampling may be implemented with one or more detection techniques, such as hook flash detection, tone detection, silence period detection, and/or the like, to introduce uncertainty with respect to a caller identifying how the system operates. A plurality of such techniques may be implemented in combination with respect to a call and/or may be rotated on a call by call basis to increase the uncertainty experienced by the caller.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 shows a flow diagram of operation according to an embodiment of the present invention.

DETAILED DESCRIPTION OF THE INVENTION

Figure 1:
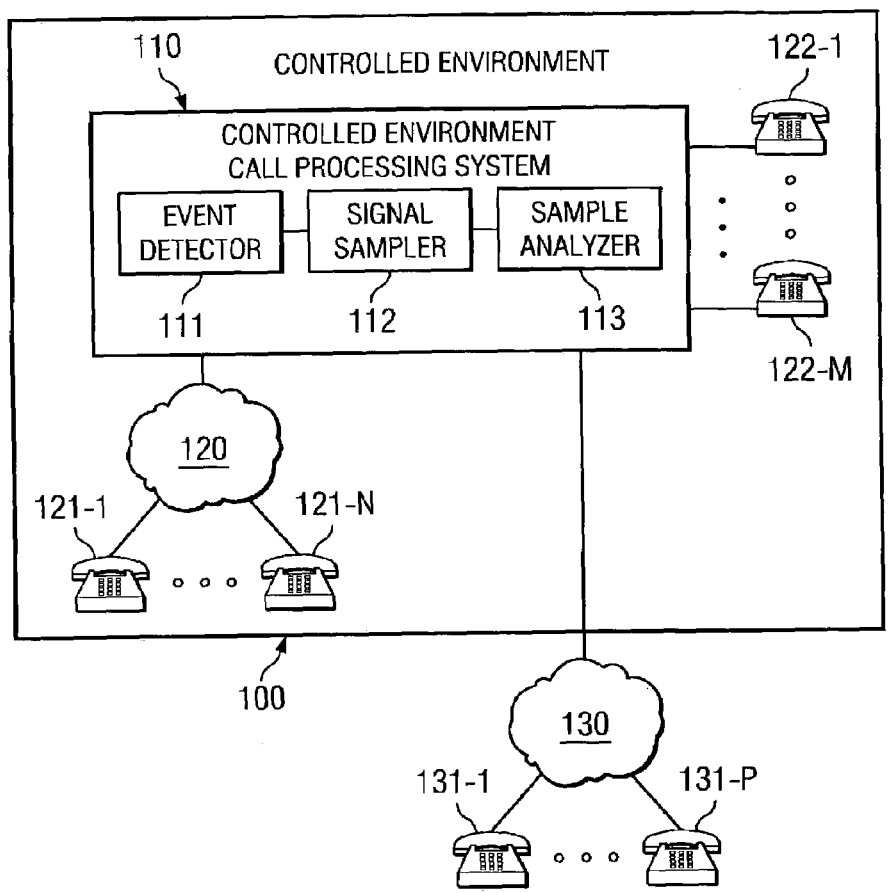
FIG. 1 shows a call processing system adapted according to an embodiment of the present invention.

Directing attention to FIG. 1, a call processing system, such as may be provided as part of a controlled environment information management system as shown in the above referenced patent application entitled "Information Management and Movement System and Method," is shown. Specifically call processing system 110, adapted according to embodiments of the present invention, is shown deployed within controlled environment facility 100. Controlled environment facility 100 may comprise any of a number of facilities, including but not limited to inmate facilities (e.g., municipal jails, county jails, state prisons, federal prisons, military stockades, juvenile facilities, and detention camps), hospitals, nursing homes, camps, schools, and the like.

As mentioned above, call processing system 110 may be provided as part of a controlled environment information management system adapted to provide information gathering, management, and/or movement functionality. For example, a controlled environment information management system, as may comprise a call processing system adapted according to the present invention, may include intelligence/management functionality and transaction/commerce functionality. Intelligence/management functionality may provide for collection, storage, and movement of information for managing various operational aspects of the controlled environment facility, including the management of personnel, residents, vendors, and resources. Transaction/commerce functionality may provide for the instigation and completion of various transactions, including requesting and providing goods and services, determining credit worthiness, verifying account balance and status, and providing for payment. Accordingly, a system providing robust information management and movement may be provided.

Although illustrated as being deployed within the controlled environment facility in FIG. 1, it should be appreciated that call processing systems adapted according to embodiments of the present invention may be deployed in a number of configurations. For example, a call processing system adapted according to the present invention may be deployed external to the controlled environment facility, having data terminals and/or other access points deployed within the controlled environment facility. Additionally or alternatively, call processing systems adapted according to the present invention may be provided in a distributed topology, such as having server systems, application programs, and/or databases distributed throughout a number of geographic locals, if desired. Of course, there is no limitation that call processing systems adapted according to the present invention be deployed with respect to a controlled environment facility and, therefore, embodiments of the present invention may be utilized in a variety of situations. However, call processing systems adapted according to the present invention are particularly useful with respect to identifying and/or preventing unauthorized call activity with respect to individuals residing within a controlled access facility, such as prisoner's within a prison facility.

As shown in FIG. 1, call processing system 110 may provide a number of access points coupled to a variety of user terminals. Accordingly, call processing system 110 of the illustrated embodiment provides connectivity to user terminals 122-1 through 122-M disposed within controlled environment facility 100 via direct connections, user terminals 121-1 through 121-N disposed within controlled environment facility 100 via indirect connections (here comprising a network or networks, referred to herein as network 120), and user terminals 131-1 through 131-P disposed external to controlled environment facility 100 via indirect connections (here comprising a network or networks, referred to herein as network 130). For example, network 120 coupling user terminals 121-1 through 121-N to call processing system 110 may comprise a private branch exchange (PBX) system, a local area network (LAN), an intranet, or other suitable communication network. Network 130 coupling user terminals 131-1 through 131-P to call processing system 110 may comprise the public switched telephone network (PSTN), a LAN, a wide area network (WAN), the Internet, or other suitable communication network.

Although the user terminal equipment illustrated in FIG. 1 comprises telephone stations, embodiments of the present invention may operate with a variety of user terminal equipment configurations. For example, user terminal equipment accommodated according to preferred embodiments of the present invention may include personal computers, personal digital assistants (PDAs), pagers, telephones (wireline and wireless), facsimile machines, and the like, coupled through direct links, such as wireline, cable, fiber optic, etcetera, and/or indirect links, such as network links, private branch exchange (PBX) links, etcetera.

Figure 2:
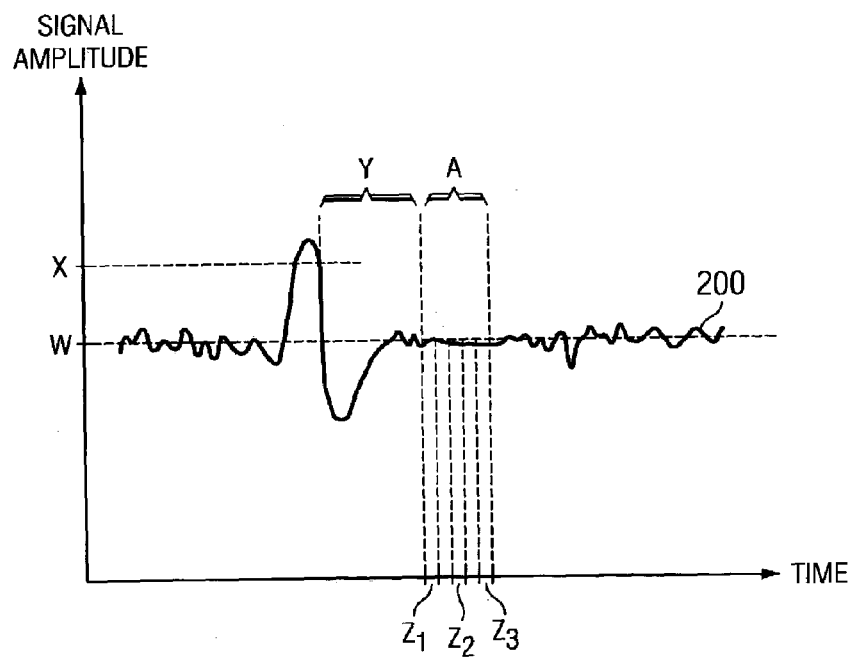
FIG. 2 shows a graphical representation of a call communication signal as monitored according to an embodiment of the present invention.

Directing attention to FIG. 2, a waveform representing an audio portion of a telephone conversation, such as may be placed via call processing system 110 between any of user terminals 121-1 through 121-N, 122-1 through 122-M, and 131-1 through 131-P, is shown. Specifically, waveform 200 of FIG. 2 may represent a telephone conversation portion as monitored by call processing system 110. For example, audio portions of telephone conversations may be converted to digital signals, such as linear digital signals conforming to the Wave (.wav) file format, as may be represented by waveform 200.

According to embodiments of the present invention, call processing system 110 is adapted to monitor communications, such as through analyzing waveforms such as waveform 200, to detect unauthorized call activity and, preferably, react accordingly. Embodiments of the present invention are adapted to detect attempts at establishing a three-way call by a party. Of course, embodiments of the invention may be utilized to detect call activity other than three-way calling, if desired.

Operation according to one embodiment for detecting an attempt at establishing a three-way call by a called party is shown in the flow diagram of FIG. 3. At step 301, a calling party, such as may be at one of user terminals 121-1 through 121-N or 122-1 through 122-M, initiates a call to a called party, such as may be at one of user terminals 131-1 through 131-P, through call processing system 110. Call processor 110 monitors the call at step 302. For example, call processor 110 may utilize analog to digital converters and digital signal processors to create and analyze a digital waveform as represented in FIG. 2.

The unauthorized call activity algorithm of the embodiment illustrated in FIG. 3 implements a plurality of steps to recognize unauthorized call activity from the energy present in the communication signal. Experimentation has revealed that signaling a switch that enhanced calling services, such as three-way calling, are desired results in a burst of high energy in the received signal. Accordingly, at step 303, the illustrated embodiment monitors signal energy to detect its exceeding a predetermined threshold (shown in FIG. 2 as X), thereby identifying an event which may correspond to unauthorized call activity, as may be provided by event detector 111 of FIG. 1. Embodiments of the present invention may, for example, establish the aforementioned predetermined high signal energy X threshold in the range of from −7 dB to −1 dB, with the predetermined threshold most preferably being −6 dB. According to one embodiment of the invention, voice signals are digitized such that amplitude is represented from 0–32,000 units. In such an embodiment it has been found that voice conversation is typically in the range of from 2,000–16,000 units. Therefore, one embodiment of the present invention selects the aforementioned predetermined high signal energy X threshold in the range of from 18,000–22,000 units (e.g., approximately 55%–70% of the maximum amplitude), such as X=20,000 units.

The fact that signal energy has exceeded such a threshold may not be conclusive of whether undesired call activity is being attempted. For example, it has been found that setting the telephone receiver down, an answering party hailing the intended called party, a party coughing, some background noises, and the like may result in signal energy exceeding the aforementioned threshold. Accordingly, at step 304, a predetermined time (shown in FIG. 2 as Y) after the signal energy has again fallen below the threshold the illustrated embodiment implements signal sampling, to thereby confirm whether undesired call activity is associated with the previously detected event, as may be provided by signal sampler 112 of FIG. 1. Waiting the predetermined time before conducting such sampling is invoked according to a preferred embodiment in order to allow signal energy to settle, e.g., reach a quiescent point, after the high signal energy event and thereby avoid "false negative" determinations. Embodiments of the present invention may, for example, establish the aforementioned predetermined quiescent time Y in the range of from 100 msec to 800 msec, with the predetermined time most preferably being 200 msec. According to one embodiment, the aforementioned predetermined quiescent time Y is selected to be approximately $\frac{1}{16}$ sec where each of sampling periods $Z_1$, $Z_2$, and $Z_3$ are selected to be $\frac{1}{8}$ sec.

In confirming whether undesired call activity is associated with the previously detected high signal energy event, the illustrated embodiment implements signal sampling within a predetermined window following the detected high signal energy event. It has been determined that a called party signaling for an enhanced calling service, such as three-way calling, results in a period of silence, i.e., lack of ambient noise associated with the completed connection between the calling and called parties as well as no voice or similar energy, being experienced for approximately 2 to 6 seconds following the high signal energy event. Lack of ambient noise and other signal energy is represented by silence threshold W shown in FIG. 2, wherein signal energy falling below this threshold is atypically quiescent for a communication link between the parties. A silence period in which signal energy remains below threshold W during an enhanced calling service is typically the result of one of the parties being placed on "hold," i.e., the communication link between the calling and called party being temporarily suspended, while the party signaling for the enhanced calling service interacts with the central office equipment, such as to dial the number of the three-way party to be added to the call and then implements another hook flash to again reconnect the original calling party to the line. Embodiments of the present invention may, for example, establish the aforementioned predetermined silence W threshold in the range of from −7 dB to −10 dB, with the predetermined silence threshold preferably being −8 dB. According to one embodiment of the invention, voice signals are digitized such that amplitude is represented from 0–32,000 units. As mentioned above, it has been found that voice conversation is typically in the range of from 2,000–16,000 units. Therefore, one embodiment of the present invention selects the aforementioned predetermined silence threshold W in the range of from 1,000–2,000 units (e.g., approximately 2%–6% of the maximum amplitude), such as W=1,500 units.

Accordingly, embodiments of the present invention implement sampling within the time frame of such a "silence window" (window A of FIG. 2) in order to make a confirming decision with respect to detecting attempted unauthorized call activity. For example, preferred embodiments of the present invention implement such sampling within a 2 to 3 second window following detection of the aforementioned high signal energy event. It has been determined that sampling within such a 2 to 3 second silence window provides accurate detection of three-way call attempts by capturing relatively quick three-way "on hold" periods without creating excessively large "false positives" associated with unusually quiet periods following a benign high signal energy event.

However, it should be appreciated that detection of unauthorized call activity is likely to experience individuals attempting to perform such activities in defiance of edicts to the contrary and, therefore, may attempt to circumvent detection techniques. For example, a caller residing in one of the aforementioned prison facilities may be inclined to have a called party accomplice initiate an unauthorized three-way call and, during the period the inmate is on hold pending dialing of the three-way number by the called party, the inmate may create substantial noise energy on the line. Experimentation has revealed that inmates will blow into a receiver, tap objects against the receiver, yell, and the like in attempting to defeat detection of unauthorized activity.

Accordingly, embodiments of the present invention operate to mute a party, or otherwise isolate signal energy associated with a party during signal sampling. For example, in the above mentioned prison facility example, after detecting a high signal energy event, embodiments of the invention may mute the inmate side of the communications link in order to perform sampling for sufficient silence with respect to the called party side of the communication to confirm unauthorized call activity.

However, as mentioned above, a variety of events may result in a high signal energy event being detected, many of which being associated with completely benign, authorized call activities. Muting a party for the full extent of a window in which sampling is invoked (e.g., window A of FIG. 2) may result in substantial disruptions in the call. For example, every time a party to a call coughs the calling party may be muted for a sampling period of 2 to 3 seconds, thereby disrupting a conversation between the parties.

Accordingly, embodiments of the present invention utilize a plurality of brief sampling periods within the aforementioned sampling window. Thus, in confirming whether undesired call activity is associated with the previously detected high signal energy event, the illustrated embodiment implements a plurality of signal samples at step 304. Referring again to FIG. 2, sampling periods $Z_1$, $Z_2$, and $Z_3$ are shown. Sampling periods $Z_1$, $Z_2$, and $Z_3$ of a preferred embodiment are relatively brief periods of time in which a party to the call, e.g., the calling party, is muted and signal energy sampled. For example, sampling periods $Z_1$, $Z_2$, and $Z_3$ may be in the range of 100 to 500 msec long and invoked at various times within the sampling window to give a view of the signal energy throughout the sampling window. Accordingly, signal energy associated with continued conversation etcetera may readily be detected without substantially impacting the on-going conversation in the event of a benign high signal energy event. Likewise, lack of signal energy associated with unauthorized call activity may be detected without a party to the conversation interfering with the samples.

Although the embodiment illustrated in FIG. 2 shows 3 sampling periods, it should be appreciated that the present invention is not limited to any particular number of sampling periods. Moreover, there is no limitation according to the present invention that the sampling periods be evenly distributed within the sample window as shown, and therefore other sampling period distributions, such as to more heavily sample the beginning, middle, or end of the sample window, may be implemented according to the present invention. However, it has been determined that 2 to 4 sampling periods distributed evenly within a sample window of 2 to 3 seconds provides reliable detection of three-way call attempts.

Embodiments of the invention may implement unauthorized call attempt determination randomization in order to prevent parties from learning the techniques used for such determinations. For example, the size of the sample window, the number of sampling periods, the length of sampling periods, the distribution of sampling periods within the sample window, etcetera may be varied from time to time, such as for each successive call, to befuddle individuals seeking to learn the technique being implemented through repeated attempts.

Referring again to FIG. 3, a confirming decision with respect to detecting attempted unauthorized call activity is made at step 305 of the illustrated embodiment by determining if silence (e.g., signal energy below threshold W) is detected in all samples (e.g., $Z_1$, $Z_2$, and $Z_3$) of the sample window, as may be provided by sample analyzer 113 of FIG. 1. If any sample is associated with non-silence, processing according to the illustrated embodiment returns to step 302 to continue monitoring the call for unauthorized activity. However, if all samples are associated with silence, processing according to the illustrated embodiment proceeds to step 306 wherein a conclusion is made that unauthorized call activity is being attempted and the appropriate responses may be taken. For example, call processing system 110 may play a message to either or both of the calling and called parties announcing that unauthorized call activity has been detected and thereafter release the call. Additionally or alternatively, call processing system 110 may record information, such as calling party identification, called party number, time of call, and perhaps a recording of the call itself, for subsequent diagnostic and/or investigative processing.

Although the above embodiment has been described with reference to concluding that unauthorized call activity is being attempted when all samples are associated with silence, it should be appreciated that embodiments of the present invention may implement various techniques for reaching such a conclusion. For example, samples may be averaged to determine if an average sample is below a predetermined level, e.g., threshold W. Particular samples may be discarded, such as to discard a highest and a lowest sample prior to averaging. Similarly, in an embodiment wherein a large number of sampling periods are implemented in a sample window, one or more such samples may be statistically discarded as anomalous in reaching a conclusion according to the present invention.

Preferred embodiments, as described above, make determinations with respect to unauthorized call activity by detecting a level of silence which not only is void of voice energy, but which also is below an ambient noise level. Accordingly, embodiments of the present invention sample a linear (i.e., not compressed) form of the signal. Such a linear form of the signal provides clarity useful in making unauthorized call activity determinations according to embodiments of the present invention. Accordingly, although call processing system 110 may implement signal compression, such as for conserving storage space when recording a call or to conserve bandwidth when transmitting signals, signals sampled according to preferred embodiments of the invention for detecting unauthorized call activity are uncompressed.

Although it is expected that the PSTN equipment, e.g., central office switches, disposed throughout a calling area, e.g., throughout a particular country or region, will exhibit similar characteristics, variations in their operation may suggest that various parameters of the above described unauthorized call attempt determinations be adjusted to accommodate particular equipment experienced. For example, the high signal energy threshold X, the quiescent time Y, and/or the silence threshold W may be adjusted to accommodate particular equipment. Embodiments of the invention may utilize a detection parameter database, such as may include information relevant to particular geographic areas, calling patterns, telephony equipment, and/or the like, for transfer to a call processing system, such as call processing system 110, upon installation or at other appropriate times, e.g., dynamically during call processing.

Such adjustment parameters may be based upon empirically acquired information and/or may be accomplished by automated processes. For example, an embodiment of the present invention may operate to automatically establish silence threshold W periodically, such as on a call by call basis, by monitoring the line during a call setup time. According to one scenario, wherein prison facility calling services are provided, an initial call setup procedure is invoked wherein a called party is contacted, an announcement played informing the called party that the call is from a prison facility, and an acceptance response monitored for before connecting the calling party to the called party. It is during this call setup time, before the called party is connected to the calling party, wherein a silence threshold is determined for each call according to one embodiment of the invention.

As mentioned above, embodiments of the invention may implement unauthorized call attempt determination randomization in order to prevent parties from learning the techniques used for such determinations. Such randomization is not limited to altering aspects of the sample window and/or sampling periods utilized according to embodiments of the present invention. For example, embodiments of the present invention implement a plurality of different techniques for detecting unauthorized call attempts. For example, embodiments of the present invention may implement hook flash detection, such as shown and described in U.S. Pat. No. 5,319,702, issued to Kitchin, the disclosure of which is incorporated herein by reference. Additionally or alternatively, embodiments of the present invention may implement tone detection, such as shown and described in U.S. Pat. No. 5,926,533, issued to Gainsburo, the disclosure of which is incorporated herein by reference. Likewise, embodiments of the present invention may implement silence period detection, such as shown and described in the above referenced United States patent application entitled "Three-Way Telephone Call Prevention System and Method."

Embodiments of the present invention may additionally or alternatively utilize indirect techniques for detecting unauthorized call activity attempts. For example, rather than detecting signal attributes related to invoking an enhanced calling service, embodiments of the present invention may detect attributes not typically found in a communication which, by implication, may be determined to be associated with unauthorized or otherwise undesirable activity. As an example, experimentation has revealed that calling parties in prison facilities are often under the belief that blowing into a receiver will defeat detection of three-way calls. Moreover, heavy sustained blowing into a receiver is typically not part of a communication apart from some form of miscreant behavior. Accordingly, embodiments of the present invention may monitor signal attributes indicative of sustained blowing into a receiver, such as the presence of broadband signal energy, above a relatively high signal energy threshold, for a period of time exceeding 2 seconds. Of course, other indirect indices of unauthorized activity may be utilized in addition to or in alternative to detection of blowing, such as a loud noise sustained for a period of time, particular key words (such as "call") spoken prior to a particular event (such as a silence period), if desired.

It should be appreciated that the above techniques may be implemented in various combinations with embodiments of event detection followed by silence sampling according to the present invention to increase the uncertainty experienced by the caller. For example, a plurality of such techniques may be implemented in combination with respect to a particular call. Additionally or alternatively, various ones of the above techniques may be selected, such as on a rotating sequence, for implementation serially with respect to different calls.

Although embodiments have been described above with reference to controlled access environments, such as prison facilities, it should be appreciated that the concepts of the present invention are applicable to any number of calling environments and situations. Moreover, there is no limitation to use of embodiments of the present invention to detect three-way calling. Likewise, there is no limitation with respect to detection of unauthorized call activity by a called or calling party and, therefore, the concepts of the present invention may be applied with respect to either or both parties to a call.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting unauthorized call activity, said method comprising:
   detecting a high signal level event;
   implementing a plurality of sampling periods within a predetermined sample window following said high signal level event; and
   analyzing samples from said sampling periods to make a determination with respect to said unauthorized call activity.

2. The method of claim 1, wherein said detecting said high signal level event comprises:
   determining if signal energy associated with a call exceeds a predetermined threshold value.

3. The method of claim 2, wherein said predetermined threshold value is in the range of 55–70% of a maximum signal amplitude.

4. The method of claim 1, wherein said implementing said plurality of sampling periods comprises:
   muting a party to a call during said sampling periods.

5. The method of claim 1, wherein said sampling periods are within the range of from 100 msec to 500 msec in duration.

6. The method of claim 1, wherein said plurality of sampling periods comprises at least 3 sampling periods.

7. The method of claim 1, wherein said sample window is within the range of from 2 to 3 seconds in duration.

8. The method of claim 1, wherein said sampling periods are distributed evenly throughout said sample window.

9. The method of claim 1, wherein said sampling periods are distributed unevenly throughout said sample window.

10. The method of claim 1, wherein analyzing said samples comprises utilizing a predetermined silence threshold value.

11. The method of claim 10, wherein said predetermined silence threshold value is in the range of 2–6% of a maximum signal amplitude.

12. The method of claim 10, wherein said predetermined silence threshold value is determined on a call by call basis.

13. The method of claim 10, wherein analyzing said samples comprises determining if any sample exceeds said predetermined silence threshold value.

14. The method of claim 10, wherein analyzing said samples comprises determining if an average derived from said samples exceeds said predetermined silence threshold value.

15. The method of claim 1, wherein analyzing said samples comprises discarding at least one of said samples.

16. The method of claim 1, further comprising:
implementing a quiescent time period between said detecting said high signal level event and implementing said plurality of sampling periods.

17. The method of claim 1, further comprising:
invoking quasi-randomization with respect to one or more parameters of said detecting a high signal level event, said implementing said plurality of sampling periods, and said analyzing said samples to thereby thwart learning a detecting technique through use thereof.

18. The method of claim 17, wherein said quasi-randomization with respect to said one or more parameters comprises varying a number of sampling periods.

19. The method of claim 17, wherein said quasi-randomization with respect to said one or more parameters comprises varying a duration of said sampling periods.

20. The method of claim 17, wherein said quasi-randomization with respect to said one or more parameters comprises varying a method of analysis used with respect to said samples.

21. The method of claim 1, further comprising:
implementing a plurality of techniques for detecting unauthorized call activity, wherein said detecting said high signal level event, said implementing said plurality of sampling periods, and said analyzing said samples comprises a first technique of said plurality of techniques.

22. The method of claim 21, wherein a second technique of said plurality of techniques comprises monitoring for signal energy continuously below a predetermined silence threshold value for at least a predetermined time to thereby provide silence period detection.

23. The method of claim 21, wherein different techniques of said plurality of techniques are implemented with respect to a particular call.

24. The method of claim 21, wherein different techniques of said plurality of techniques are implemented on a call by call basis.

25. The method of claim 1, wherein sampling of said call is accomplished with respect to a linear representation of a call signal.

26. A system for detecting unauthorized call activity, said system comprising:
an event detector indicating when signal energy associated with a communication link between said calling party and said called party exceeds a predetermined event threshold;
a signal sampler to produce a plurality of samples from said communication link following event detection by said event detector; and
a sample analyzer providing analysis with respect to said samples and providing a determination with respect to unauthorized call activity.

27. The system of claim 26, wherein said event detector, said signal sampler, and said sample analyzer are part of a call processing system.

28. The system of claim 27, wherein said unauthorized call activity comprises a party disposed remote to said call processor signaling telecommunications equipment to invoke an enhanced calling service.

29. The system of claim 27, wherein said call processing system is disposed within a controlled environment facility.

30. The system of claim 29, wherein said controlled environment facility comprises a prison facility.

31. The system of claim 26, said event detector indicates signal energy exceeding said predetermined event threshold without regard to signal frequency.

32. The system of claim 26, further comprising:
a database of parameters for adjusting operation of at least one of said event detector, said signal sampler, and said sample analyzer.

33. The system of claim 32, wherein a subset of said parameters are provided to a call processing system hosting said event detector, said signal sampler, and said sample analyzer upon installation.

34. The system of claim 32, wherein a subset of said parameters of said database are accessed by a call processing system hosting said event detector, said signal sampler, and said sample analyzer during real-time processing of a call.

35. A method for detecting a three-way call attempt, said method comprising:
detecting a high signal level event in a call;
implementing a plurality of sampling periods within a predetermined sample window following said high signal level event, wherein a party to said call is muted during each of said sampling periods and unmuted between said sampling periods; and
analyzing samples from said sampling periods to determine if silence below an ambient noise level exists in said sample window.

36. The method of claim 35, wherein said detecting said high signal level event comprises:
determining if signal energy associated with said call exceeds a predetermined threshold value.

37. The method of claim 35, wherein said plurality of sampling periods comprises at least 3 sampling periods.

38. The method of claim 35, wherein said sampling periods are distributed evenly throughout said sample window.

39. The method of claim 35, wherein said sampling periods are distributed unevenly throughout said sample window.

40. The method of claim 35, wherein analyzing said samples comprises determining if any sample exceeds a predetermined silence threshold value.

41. The method of claim 35, wherein analyzing said samples comprises determining if an average derived from said samples exceeds a predetermined silence threshold value.

42. The method of claim 35, further comprising:
implementing a quiescent time period between said detecting said high signal level event and implementing said plurality of sampling periods.

43. The method of claim 35, further comprising:
varying one or more parameters of said detecting a high signal level event, said implementing said plurality of sampling periods, and said analyzing said samples.

44. The method of claim 43, wherein said varying said one or more parameters comprises varying a number of sampling periods.

45. The method of claim 43, wherein said varying said one or more parameters comprises varying a duration of said sampling periods.

46. The method of claim 43, wherein said varying said one or more parameters comprises varying a method of analysis used with respect to said samples.

47. The method of claim 35, further comprising:
implementing a plurality of techniques for detecting unauthorized call activity, wherein said detecting said high signal level event, said implementing said plurality of sampling periods, and said analyzing said samples comprises a first technique of said plurality of techniques.

48. The method of claim 47, wherein different techniques of said plurality of techniques are implemented with respect to a particular call.

49. The method of claim 47, wherein different techniques of said plurality of techniques are implemented on a call by call basis.

50. The method of claim 35, wherein sampling of said call is accomplished with respect to a linear representation of a call signal.

* * * * *